June 15, 1926.  E. W. GILPATRICK  1,588,672
SECTIONAL RIM
Filed April 9, 1923   2 Sheets-Sheet 1
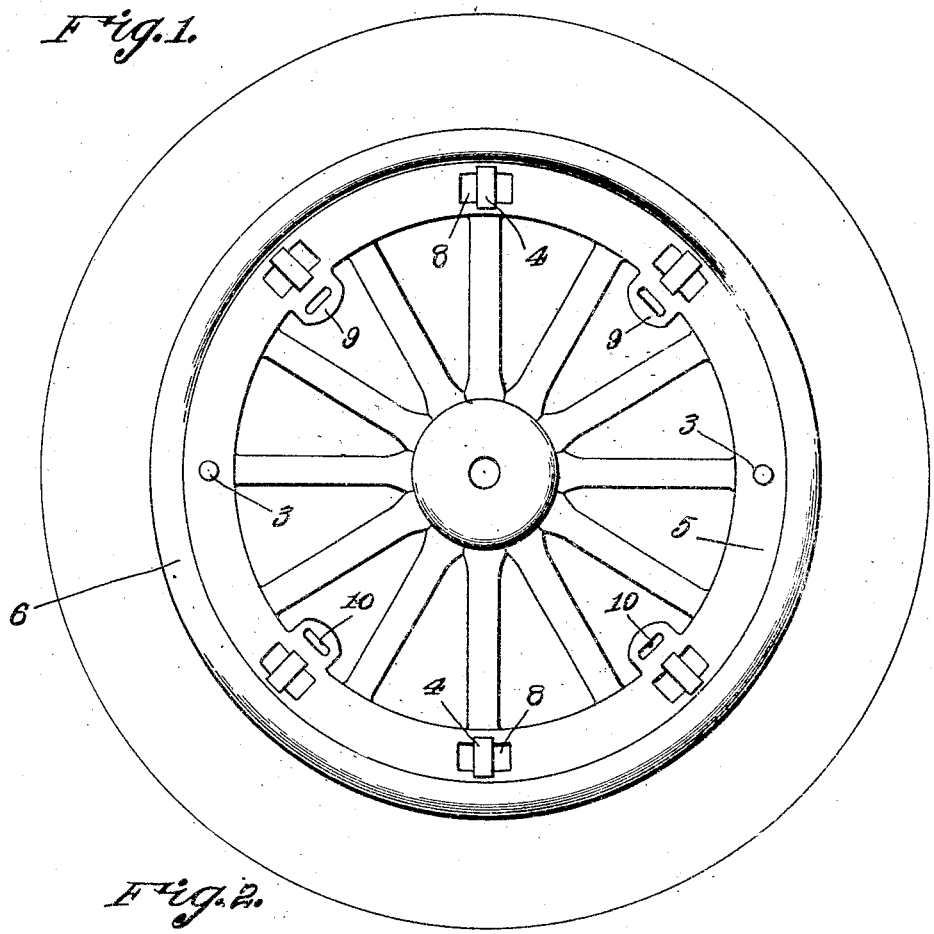
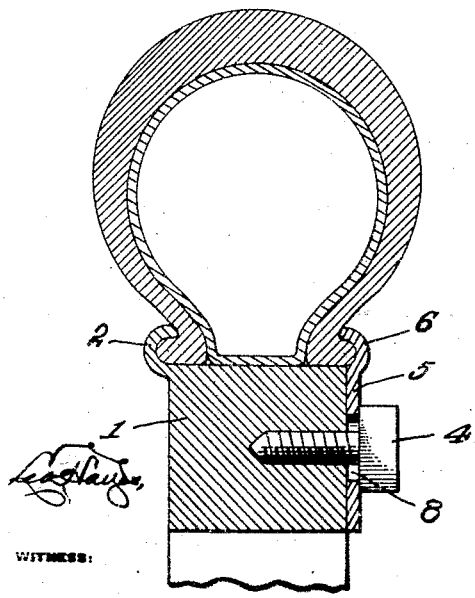
E. W. Gilpatrick
INVENTOR
by Victor J. Evans
ATTORNEY June 15, 1926.  
E. W. GILPATRICK  
SECTIONAL RIM  
Filed April 9, 1923  
1,588,672  
2 Sheets-Sheet 2

Patented June 15, 1926.

1,588,672

UNITED STATES PATENT OFFICE.

EARL WILLIS GILPATRICK, OF WHITING, MAINE.

SECTIONAL RIM.

Application filed April 9, 1923. Serial No. 630,886.

This invention relates to a wheel for automobiles, the general object of the invention being to provide means whereby a tire can be easily and quickly removed from the wheel or placed thereon.

Another object of the invention is to provide headed bolts for holding the detachable ring on the wheel with slots in the ring for receiving the heads of the bolts so that by turning the bolts a quarter-turn, the ring will be secured to the wheel.

This invention also consists in certain other features of construction, and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation of the improved wheel.

Figure 2 is a sectional view thereof.

Figure 5 is a view of the wrench which is used for turning the bolts.

Figure 3:
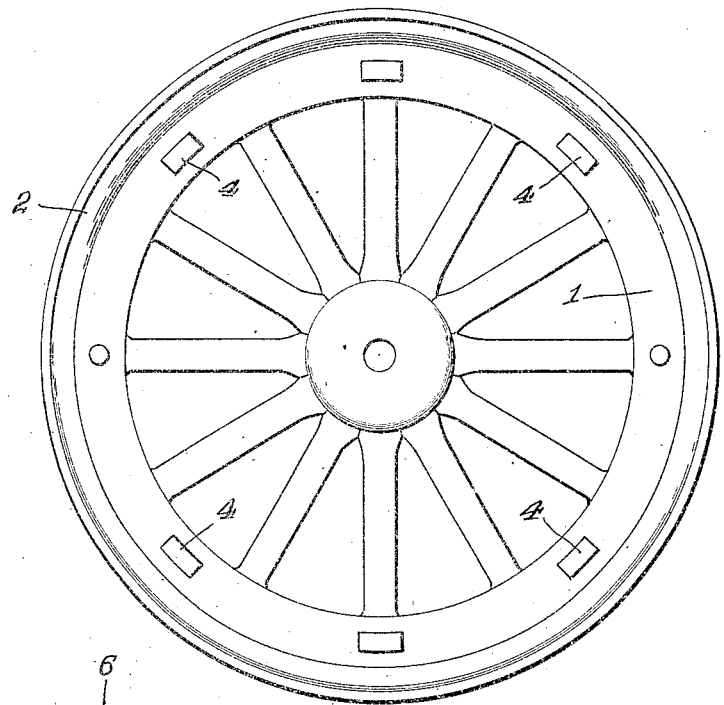
Figure 3 is a view of the wheel without the ring.
Figure 4:
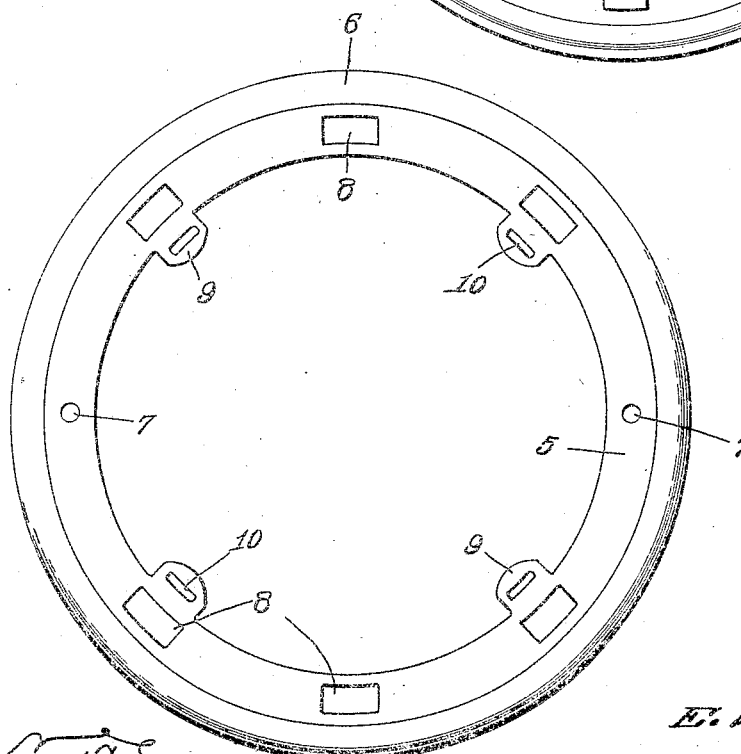
Figure 4 is a view of the ring alone.

In these views, 1 indicates the wheel which may be cast in one piece or it may be formed in sections, as desired. The felly of the wheel is provided with the usual flange 2, for engaging the bead at one side of the tire. Lugs 3 project from one side of the felly, these lugs being diametrically arranged. Bolts 4 are carried by the side of the felly, these bolts being provided with large rectangular heads. The ring is shown at 5 and it is provided with the usual flange 6 for engaging the opposite bead of the tire. The ring is provided with the diametrically arranged holes 7 for receiving the projections 3 and with the rectangular holes 8 for receiving the heads of the bolts 4. The ring is also provided with the inwardly extending ears 9 provided with the holes 10 for facilitating handling of the ring. A wrench 11 is provided for turning the bolts 4 and it will be seen that by turning the bolts, so that the heads can pass through the holes 8 in the ring, the ring can be taken off the wheel so that a tire can be removed therefrom or placed thereon. By turning the bolts so that the heads extend crosswise of the holes 8 the ring will be held in place. By this invention a tire can be easily and quickly placed on a wheel and removed therefrom. There is no danger of gravel or the like getting inside the ring or of pinching the tire with the tire tools now in use, as no tools are necessary to remove the ring from the wheel or to put it in place.

It is thought from the foregoing description that the advantages and novel features of my invention will be readily apparent.

I desire it to be understood that I may make changes in the construction and in the combination and arrangement of the several parts, provided that such changes fall within the scope of the appended claim.

Having thus described my invention what I desire to claim as new is:—

A wheel having a tire engaging flange at one side of its felly, rectangular headed bolts rotatably mounted in the other side of the felly, a ring for engaging the outer side of the felly and having a tire engaging flange thereon and rectangular holes therein for receiving the heads of the bolts, said heads locking the ring on the felly when rotated a quarter turn, projections on the felly engaging holes in the ring, inwardly extending ears on the ring having slots therein for receiving a tool to facilitate handling of the ring and its removal from the felly.

In testimony whereof I affix my signature.

EARL WILLIS GILPATRICK.